Patented June 11, 1940

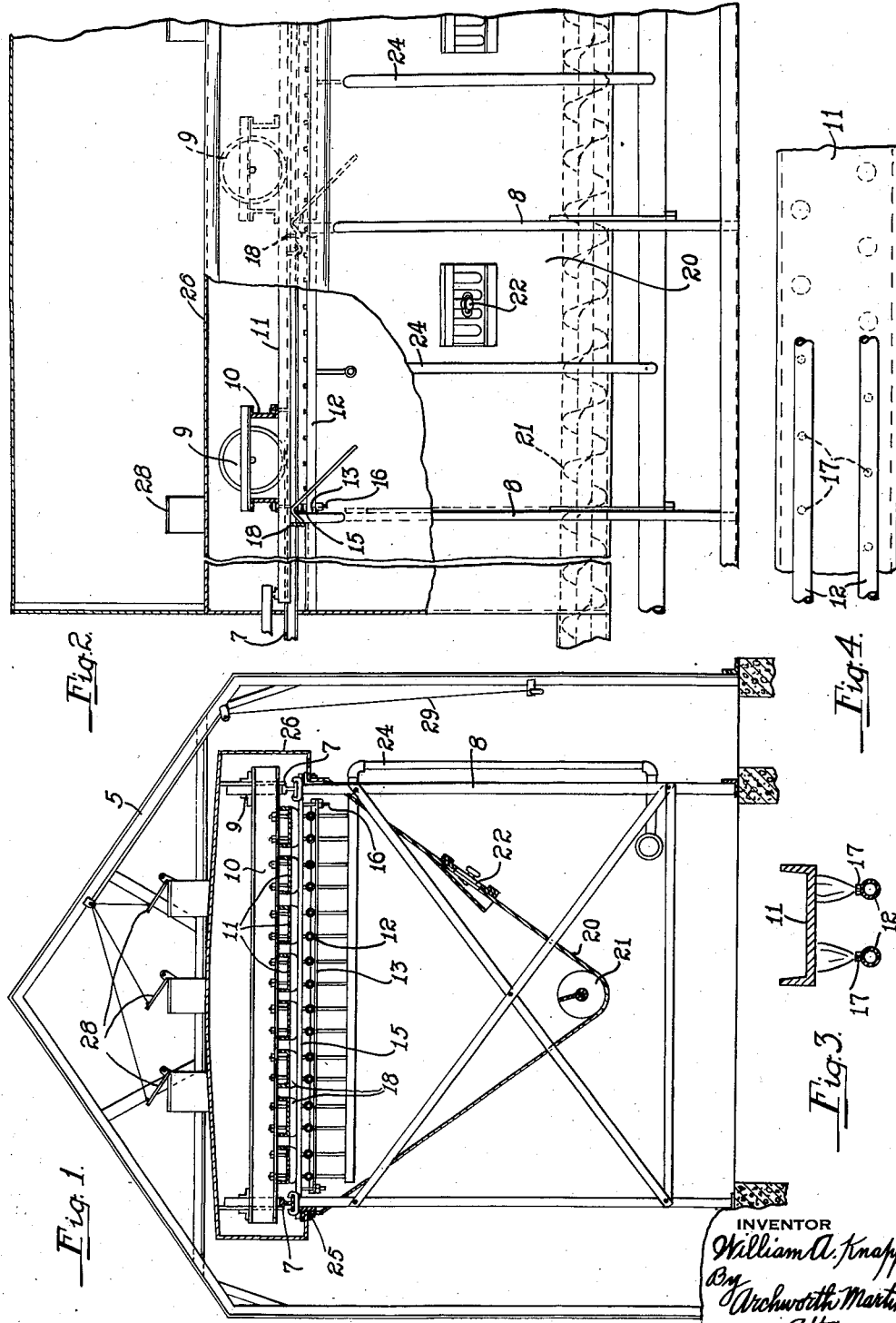

2,204,366

UNITED STATES PATENT OFFICE 2,204,366

METHOD OF MAKING CARBON BLACK

William A. Knapp, Monroe, La., assignor to Imperial Oil & Gas Products Company, Pittsburgh, Pa., a corporation of West Virginia Application February 12, 1936, Serial No. 63,530
Renewed November 8, 1939

2 Claims. (Cl. 134—60)

My invention relates to the art of producing carbon black through the partial combustion of carbon black forming gases or vapors, and the collection of the carbon black particles on surfaces disposed in proximity to the flames.

My invention has for its object the provision of a method whereby it is possible to secure a greater quantity yield or percentage of carbon black of a desired high quality from a given volume of gas or hydrocarbon vapor.

Straight channel collecting surfaces have heretofore been employed for the collection of carbon black from burner flames, and rotating cylinders have also been employed as collecting surfaces. The channel method has been employed where the greatest percentage of recovery is desired, but at sacrifice of certain desirable qualities. For the better grades of carbon black, it has been common practice to employ cylinders as the collection mediums, and while such devices will not secure as great a quantity yield from a given amount of gas, the quality of the carbon black is superior to that heretofore collected on the channels. This has been due to the fact that in order to secure carbon black that is not tacky, and which will flow more readily, and which will also possess the desirable qualities of being capable of more quickly absorbing liquids, and of absorbing a less quantity of liquids, the collected carbon black is not over-heated on the cylinders, and is more or less continually enveloped by smoke and volatile matter from the burner flames which volatile matter and smoke will be absorbed by the deposited carbon black.

The carbon black thus produced has what is known as a good mastone color, better flowing quality, and better tinting strength than the carbon blacks produced on channels by the old methods. In those older methods, the collected soot or carbon black was over-heated by the burner flames, with the result that some of the more valuable highly volatile constituents were burnt or driven off, and there was little or no absorption of smoke and vapors by the deposited soot.

By my method, I secure the advantages of large quantity yield that is possible through the use of a channel, and am also enabled to secure a quality of carbon black equal to that heretofore produced on cylinders.

One form of apparatus for practising my invention is shown in the accompanying drawing, wherein Figure 1 is a cross sectional view through a burner building; Fig. 2 is a fragmentary longitudinal view thereof, partially in section; Fig. 3 is a cross sectional view, on an enlarged scale, of one of the collecting channels and burners associated therewith, and Fig. 4 is an inverted plan view thereof.

The burner building 5 may be of somewhat the usual form with suitable air inlets near the bottom, and with suitable smoke outlets. Track rails 7 extend longitudinally of the building and are supported on posts or uprights 8. A truck or carriage 9 is moved back and forth on the tracks 7 at desired rates of speed, as will be hereinafter explained. The trucks are provided with transversely-extending beams 10, to which collecting channels 11 are bolted.

Burner pipes 12 are supported upon cross bars 13 which are hung from beams 15 that are supported by the uprights 8, through the medium of bolts 16. The pipes can be vertically adjusted with respect to the channels 11 by means of the nuts on the bolts 16.

There is one pair of pipes for each channel 11. Each pipe is provided with a series of burner tips 17 distributed along the length of the pipe, the tips of one pipe being staggered in longitudinal directions with respect to the tips of the other pipes, so that there will not be too great concentration of flame and heat at particular spots. Scrapers 18 are hung on the bars 15 so as to scrape off the carbon black as it becomes deposited on the channels, during reciprocation of the channels. The carbon black falls into a hopper or trough 20 that serves as a casing for enclosing the underside of the burner structure. This trough can be made in a plurality of short units, each located under one of the scrapers, instead of as a single long trough. A screw conveyer 21 is utilized to discharge the carbon black from the hopper or casing 20. Draft doors 22 are provided in the sides of the casing 20 for admitting desired quantities of air for combustion. Pipes 24 leading through one side of the casing 20 for supplying tips 17 are provided.

The upper edges of the casing 20 are bolted on angles 25 that extend longitudinally of the building, and a hood 26 is also secured to said angles. The hood serves to confine smoke and vapor in the vicinity of the channels to such extent that considerable quantities of the smoke and vapor will be absorbed by the deposited soot or carbon black, so that a high quality absorbing black as above referred to can be produced.

This absorption of the vapors and smoke is in the nature of what might be termed a tempering cycle of operation. Dampers 28 are provided at the top of the hood 26 to permit sufficient air for combustion to flow through the hood, and to prevent excessive heating within the hood. These dampers are adjustable through the medium of a cable 29, or other suitable means for controlling ventilation.

In the collection of the lower qualities of carbon black on channels, as commonly practiced, the burner building temperature is usually too high for the best quality of long flow carbon black. In the present instance, the temperature within the hood 26 will preferably be in the neighborhood of 500° F. However, I may employ temperatures as high as 1100° F. in the hood, when making carbon black for paints and lacquers and up to the intense color blacks. At this temperature, there will be somewhat less absorption of volatile matter. The temperatures at the tips and channels will, of course, be much greater than 500° F.

In order to prevent excessive heating of the channel and consequent burning or driving off of the more volatile elements from the carbon black which is deposited on the channels, I space the burner tips 17 about 3½ inches below the channels 11, and have the flame from each tip of such length that it will spread on the channel over a circular area of about one inch in diameter. At each channel, the tips in each row are approximately 4¼ inches center-to-center, and the distance between the tips of one row and the adjacent tips of the other row are also approximately 4¼ inches. The foregoing dimensions are those found suitable for use with natural gas in the Louisiana fields. For other fields, suitable changes would be made to conform to the character of gases found there.

With the scrapers 18 approximately four feet apart, and by reciprocating the channels above the burners, at a speed of 4 feet in 7 hours, I produce a carbon black which is of dark blue undertone color or good mastone color, and of good flowing quality. If the channels are moved at the rate of 4 feet in 3½ hours, there is a greater yield of carbon black, and it possesses better tinting strength, than if moved at a faster rate of speed. For producing the lower qualities of what are known as ink blacks, the channels will be moved at the rate of approximately 4 feet in 20 to 30 minutes, while for producing blacks to be used in the making of rubber, the channels will be moved at the rate of approximately 4 feet in 10 minutes.

I claim as my invention:

1. The method of producing carbon black, which comprises moving a flat collecting surface over burner tips positioned to produce on the said surface areas of flame spread which are of lesser width than the spaces between said areas, confining the products of combustion from the burner to a zone closely surrounding the said surface, at a temperature not substantially less than 500° F., and removing the deposited carbon black from said collecting surface after it has been exposed to said products of combustion for a period of not substantially less than 3½ hours.

2. The method of producing carbon black, which comprises moving a flat collecting surface over burner tips positioned to produce on the said surface areas of flame spread which are of lesser width than the spaces between said areas, confining the products of combustion from the burner to a zone closely surrounding the said surface, at a temperature not substantially less than 500° F., and removing the deposited carbon black from said collecting surface after it has been exposed to said products of combustion for periods of from 3½ to 7 hours.

WILLIAM A. KNAPP.